United States Patent Office 3,563,885
Patented Feb. 16, 1971

3,563,885
REMOVAL OF DISPERSED SOLIDS FROM
A LIQUID
Alfred F. Talbot, Wallingford, Pa., assignor to Sun Oil
Company, Philadelphia, Pa., a corporation of New
Jersey
No Drawing. Filed Aug. 13, 1969, Ser. No. 849,877
Int. Cl. C10m 11/00
U.S. Cl. 208—180                                    7 Claims

ABSTRACT OF THE DISCLOSURE

Dispersed solids can be efficiently removed from an organic liquid by adding a small quantity of ultra high molecular weight polyethylene to the liquid containing the dispersed solids. This polyethylene has a weight average molecular weight in the range of 500,000 to 6,000,000. The resulting mixture of liquid, dispersed solids and the polyethylene is agitated at an elevated temperature until the polyethylene goes into solution. Afterwards the mixture is allowed to cool and coagulation occurs. The coagulated material comprising dispersed solids and the polyethylene can be simply removed by known techniques.

BACKGROUND OF THE INVENTION

This invention relates generally to a method of removing dispersed solids from an organic liquid. Spceifically this invention relates to a method of removing many dispersed solids from many organic liquids, both materials defined hereinafter. This method requires, in addition to processing steps, the addition of a small quantity of ultra high molecular weight polyethylene to the liquid containing the dispersed solids. This polyethylene has a weight average molecular weight in the range of 500,000 to 6,000,000 and is referred to herein for convenience as "UHMW PE."

In the petroleum and chemical industries vast quantities of organic liquids are treated by contacting with solid materials. For example, in petroleum processing, natural clay absorbents and synthetic absorbents are used to treat hydrocarbon products to improve color and odor; to eliminate water, suspended impurities, resinous or asphaltic substances, nitrogen compounds, oxygenated compounds and some sulfur compounds; and to absorb preferentially some hydrocarbons such as olefins. Bone char is used to decolorize oil. Also, in catalytic cracking, hydrocarbons are contacted with various catalysts, such as silica alumina, silica magnesia, bentonite clays and kaolin clays, to change their molecular weights. In the conversion of coal into hydrocarbons tremendous quantities of liquid hydrocarbons are produced containing unreacted coal and ash particles.

In the foregoing examples the treating equipment itself is designed so that most of the solids used for treating the liquid remains in the equipment when the liquid is removed. More often than not a small amount of solids is carried along by the liquid when the latter is removed. Thus, additional equipment, such as filters or centrifuges, is used to remove any carried along dispersed solids. These solid-liquid separation steps are costly and effective removal of the dispersed solids often is not achieved.

In many other industries large quantities of organic liquids are processed to remove dispersed solids. For example, in the dry cleaning industry powdered activated carbon is used in the reclamation of solvents. Specifically the carbon is used to remove odor and color from petroleum distillates and perchloroethylene used in dry cleaning. Any activated carbon particles in these liquids must be removed before they are used again to treat clothing. In this latter process the removal of fibers is also necessary to prevent the clogging of screens and nozzles present in the dry cleaning equipment.

Consequently, a method of removing dispersed solids from a liquid which does not require large investments for high operating cost equipment is highly desired. Also a method that increases the percent removal of solids from a liquid via conventional apparatus would be extremely advantageous.

SUMMARY OF THE INVENTION

Many dispersed solids can be easily removed from an organic liquid by adding 1.5 to 60 grams of UHMW PE to 100 liters of the liquid containing the dispersed solids, agitating the resulting mixture at a temperature above the melting point of the UHMW PE until the UHMW PE goes into solution, cooling the mixture until coagulation occurs and then removing the coagulated material. The dispersed solids are insoluble in the liquid from which they are being removed up to a temperature of at least 300° C. Examples of such solids are inorganic particles, carbon particles, natural fibers and synthetic fibers. The liquid is one capable of dissolving the polyethylene at a temperature between the melting point of the polyethylene and 400° C. Examples of such liquids are hydrocarbons, halogenated hydrocarbons, esters, ethers and ketones.

DESCRIPTION

The invention relates to a method of removing many dispersed solids from organic liquids, such solids and liquids being defined herein. The dispersed solids are insoluble in the liquid up to a temperature of at least 300° C. but preferably at least at 400° C. The size of the solid particle can range from the size of an extremely small clay particle—0.01 micron—to the size of an extremely large particle of fine sand—100 microns. The method is not influenced by the specific gravity of the solid. The shape of the solid particle can range from a long thin straight cylindrical rod-like human hair—or a thin wavy cylindrical rod-like cloth fiber—to a perfect sphere. Some examples of the specific classes are inorganic particles, carbon particles, natural or synthetic fibers. Some examples of inorganic particles are clay and copper dust; examples of carbon particles are bone char and activated carbon; natural fibers include cellulosic fibers such as cotton, protein fibers such as wool, and inorganic fibers such as asbestos fibers; synthetic fibers include nylon and others. The dispersed solids also can be an almost indefinable collection of many solids, for example, household or industrial dust or dirt.

The aforementioned solids are insoluble in the organic liquids from which they are to be separated up to a temperature of at least 300° C. The organic liquid is one in which UHMW PE is insoluble at ambient temperatures but is soluble at a temperature between the melting point of the polyethylene and 400° C. Some examples of specific classes of liquids are hydrocarbons, halogenated hydrocarbons, esters, ethers and ketones. The liquid can be one specific chemical compound such as benzene or a mixture of several compounds such as benzene and chlorobenzene. If the boiling point of the liquid is less than the melting point of the UHMW PE, the method can be conducted under pressure.

Polyethylenes are available with a wide range of molecular weights. These molecular weights have a substantial effect on the properties of the polyethylene. For example a polyethylene with a molecular weight of 1500 is a waxy solid while a polyethylene with a molecular weight of 1,500,000 is a hard, extremely tough solid. As discussed herein molecular weight refers to weight average molecular weight determined by light scattering or solution viscosity or melt viscosity.

In the synthesis of polyethylene, not all the molecules grow to the same size. The actual size variation depends upon the polymerization employed. Consequently, while the molecular weight of the UHMW PE referred to in the examples herein is stated as being 1,500,000, there are in fact individual molecules in the UHMW PE with molecular weights lower than 1,500,000 and even lower than 1,000,000. Sometimes, the individual molecules have molecular weights as low as 500,000. Also in the same 1,500,000 weight average molecular weight polyethylene there are in fact individual molecules with molecular weights greater than 2,000,000. Sometimes the individual molecules have molecular weights as high as 3,000,000 or even as high as 6,000,000. Thus the polyethylene used in this invention can have a weight average molecular weight in the range of 500,000 to 6,000,000.

In this process the liquid from which the dispersed solids are removed is capable of dissolving the UHMW PE between the latter's melting point and 400° C. This melting point is the crystalline melt point. This term is defined as follows. When polyethylene is heated above 60–80° C. its crystallinity declines gradually, giving way to an increasing percentage of amorphous material. When the rising temperature has caused the resin to lose all of its crystalline structure and to become completely amorphous, it has reached its melting point and changed from a solid to a highly viscous liquid. This crystalline melt point or melting point depends in part on the molecular weight of UHMW PE. For example, a UHMW PE with a molecular weight of 1,750,000 has a melting point of 136° C. whereas an UHMW PE with a molecular weight of 3,000,000 has a melting point of 129° C.

In this process it is desirable that the liquid from which the dispersed solids are removed is capable of dissolving substantial amount of UHMW PE before the temperature of the mixture is as high as 400° C. It is more desirable that the liquid dissolve substantial amounts of UHMW PE before the temperature of the mixture is as high as 300° C. At temperatures greater than 400° C. UHMW PE rapidly degrades to low molecular weight waxes which degradation would cause this process to be ineffective. At temperatures between about 350° C. to about 400° C. some thermal degradation of UHMW PE occurs but the process is still effective. At temperatures between about 300° C. to about 350° C. the first traces of molecular weight reduction occur.

Surprisingly when a small quantity of UHMW PE comes out of solution in a mixture of a liquid and dispersed solids, both defined herein, the UHMW PE suddenly coagulates, containing within the coagulated UHMW PE the dispersed solids. This coagulation clarifies the liquid. The resulting coagulated mass has a relatively good tendency to stay together even with mild agitation. This phenomenon is contrary to what happens when a lower molecular weight polyethylene comes out of solution in the same mixture of liquid and dispersed solids. When this lower molecular weight polyethylene comes out of solution it coats the individual dispersed solids, but the lower molecular weight polyethylene coated dispersed solids do not coagulate into a large distinct mass or several distinct masses. The reason for this difference is perhaps related to the extremely long length of a molecule of UHMW PE. The extremely long length of the molecule of UHMW PE could permit a portion of the molecule to wrap itself around the dispersed solid while the remaining portion entangles itself with a similar UHMW PE molecule. Or, the long length of the molecule of UHMW PE permits a portion of it to use a dispersed solid as a nucleus about which to come out of solution while the balance of the molecule entangles itself with a similar molecule.

The proportion of UHMW PE to organic liquid that can be used to clarify the liquid ranges from 1.5 to 60 grams of UHMW PE to 100 liters of liquid containing the dispersed solids. However, a particularly useful range is from 3 to 30 grams of UHMW PE per 100 liters of liquid.

The UHMW PE can be added to the liquid at various times during the process. For example, the necessary amount of UHMW PE can be added to the liquid containing the solids at ambient conditions. The resulting mixture is then heated while being agitated to a temperature equal to or greater than the melting point of the polyethylene. This temperature is maintained until the polyethylene goes into solution. The mixture is allowed to cool with or without agitation, until coagulation occurs. Alternatively, the liquid and dispersed solids can first be heated to a temperature equal to or greater than the melting point of the polyethylene and the UHMW PE then added; again the aforementioned temperature is maintained and the mixture is agitated until the polyethylene goes into solution. The mixture is allowed to cool until coagulation occurs. Either method works equally well. Variations of the two described techniques also work equally well. The coagulated material can be removed by decantation, filtration or centrifugation.

EXAMPLES

Several different types of solids were dispersed in several different organic fluids for illustrative purposes. Typical properties of the solids used are as follows:

| Solids | Properties |
| --- | --- |
| Talc | Apparent density, 11 to 13 lbs./cu. ft.; particle size, 100% finer than 15 microns, 18.8% finer than 1 micron. |
| Attapulgite | Particle size, average 0.12 micron; particle shape, needle like. |
| Mica | Average particle size, 10 to 20 microns in diameter and 1 micron in thickness to 5 to 10 microns in diameter and ½ micron in thickness. |
| Calcined aluminum silicate | Average particle size, 1.2 microns; particle shape, thin flat plate. |
| Hydrous aluminum silicate | Average particle size, 4.8 microns; particle shape, thin flat plate. |
| Titanium dioxide | Specific gravity, 4.22 minimum TiO₂, 97 wt. percent. |

The bone charcoal and asbestos fibers used were commercial grades of these materials. The organic fluids used were reagent grade. A typical UHMW PE, used herein for illustrative purposes has a weight average molecular weight of 1,500,000; a specific gravity of 0.94 (ASTMD-792), a crystalline melt point of 135° C. as determined by differential thermal analysis and a nil melt index (ASTM D-1238).

This invention was demonstrated in the following manner. First, the finely divided solids were dispersed in the fluid contained in the proper size flask by use of a magnetic stirring bar. The contents were heated to a temperature of about 130 to 145° C. with agitation, whereupon the UHMW PE was added. After the UHMW PE melted and went into solution, the dispersion was allowed to cool while being gently stirred. Coagulation usually occurred at temperatures of about 85 to 100° C. and was generally quite sudden. The coagulated solids were in the form of granules, lumps or a solid mass. In some cases the coagulated solids were recovered by decantation, and then were washed with the appropriate solvent and air dried, prior to weighing the recovered mass.

The results of eleven runs are shown in the accompanying table. In Run 1 a polyethylene with a molecular weight of about 3000 was used to treat xylene containing dispersed calcined aluminum silicates and titanium dioxide. No coagulation occurred. However, in Run 2 UHMW PE was used to treat the same mixture as in Run 1 and although the amount used was only 20% of the quantity of polyethylene used in Run 1 coagulation occured. The additional Runs 3 to 11, with various liquids and different dispersed solids, indicate the versatility of this process. In addition the amount of solid material recovered compared to the amount of solids and UHMW PE added to the liquid, as shown in the table, gave an indication of the efficiency of the process. Thus in Run 4 a total of 5.025 grams of solids were added to the liquid and 4.95 grams of solids were recovered for a 98.5 weight percent recovery. This high weight recovery was obtained just by decantation, that is without any physical separation device such as filter paper.

TABLE I.—RESULTS OF RUNS 1 TO 11

| Run | Fluid Type | Fluid Volume, ml | Solids in fluid Type | Solids Weight, g. | Polyethylene Type | Polyethylene Weight, g. | Coagulation | Weight of solids recovered, g. |
|---|---|---|---|---|---|---|---|---|
| 1 | Xylene | 200 | Calcined aluminum silicates, TiO$_2$ | 10, 10 | Lower molecular weight* | 0.5 | No | |
| 2 | do | 200 | Calcined aluminum silicates, TiO$_2$ | 10 | UHMWPE** | 0.1 | Yes | |
| 3 | do | 150 | Hydrous aluminum silicate | 10 | UHMWPE** | 0.025 | Yes | |
| 4 | do | 150 | do | 5.0 | UHMWPE** | 0.025 | Yes | 4.95 |
| 5 | do | 100 | do | 2.76 | UHMWPE* | 0.025 | Yes | |
| 6 | do | 75 | Talc | 2.5 | UHMWPE** | 0.25 | Yes | 2.52 |
| 7 | do | 75 | Attapulgite | 2.5 | UHMWPE** | 0.25 | Yes | 2.40 |
| 8 | n Decane | 75 | Bone charcoal | 2.5 | UHMWPE** | 0.012 | Trace | |
| 9 | do | 75 | do | 2.5 | UHMWPE** | 0.036 | Yes | 2.49 |
| 10 | Chloro-benzene | 75 | Asbestos fiber | 0.4 | UHMWPE** | 0.003 | Yes | 0.40 |
| 11 | Decalin | 75 | Mica | 1.0 | UHMWPE** | 0.0025 | Yes | 0.98 |

* Molecular weight about 3,000.  **Molecular weight of 1,500,000.

Substantially equivalent results are obtained when other liquids and/or solids as herein specified are used.

One of the many utilities of the method defined herein is illustrated by the following specific example of treating dirty laundry oil. The latter is an oil that is used to clean and impregnate textile cleaning mops and cloths both of which are used in industrial housekeeping. One such oil is a naphthenic oil with a specific gravity at 60° F. of 0.9140, viscosity of 115, SUS at 100° F. and a viscosity of 41.0, SUS at 210° F. About 80 milliliters of such a dirty laundry oil, having a murky appearance and containing about 3 percent by volume of industrial dirt comprising fibers and metal particles was treated with UHMW PE in the following manner. 0.0222 gram of UHMW PE was added to the dirty laundry oil and the resulting mixture was heated to a temperature of about 130 to 145° C. with agitation. After the UHMW PE melted and went into solution the resulting mixture was allowed to cool. At some temperature below the melting point of the UHMW PE coagulation occurred. A large distinct mass was formed. The liquid was decanted from the coagulated mass. This liquid had a bright, clear appearance. Another 80 milliliters of the same dirty laundry oil was treated with 0.226 gram of polyethylene with a molecular weight of about 150,000 using a similar technique as to that used with the UHMW PE. However, upon cooling, no coagulation occurred. Thus it was not possible to satisfactorily decant the dirty laundry oil treated with the lower molecular weight polyethylene. This specific example demonstrates that the use of a lower molecular weight polyethylene is unsatisfactory whereas UHMW PE is satisfactory in the removal of dispersed solids from a dirty laundry oil.

The invention claimed is:

1. A method of removing dispersed solids from a liquid, said solids being insoluble in the liquid up to a temperature of at least 300° C. and said liquid being capable of dissolving polyethylene with a weight average molecular weight in the range of 500,000 to 6,000,000 at a temperature between the melting point of the polyethylene and 400° C. comprising:

(a) adding polyethylene having said molecular weight to the liquid containing dispersed solids, the amount of polyethylene added to the liquid being between 1.5 and 60 grams per 100 liters of liquid;

(b) agitating the resulting mixture at a temperature above the melting point of the polyethylene and at a pressure sufficient to maintain said liquid in liquid phase until the polyethylene goes into solution;

(c) cooling the mixture until coagulation occurs; and then (d) removing the coagulated material comprising dispersed solids and polyethylene from the liquid.

2. A method according to claim 1 wherein the dispersed solids are inorganic particles, carbon particles, natural fibers, synthetic fibers or mixtures of two or more such solids.

3. A method according to claim 1 wherein the liquid is a hydrocarbon, halogenated hydrocarbon, ester, ether, ketone or a mixture of two or more such liquids.

4. A method according to claim 1 wherein said solids are insoluble in the liquid up to a temperature of at least 400° C. and said liquid is capable of dissolving said polyethylene at a temperature between the melting point of the polyethylene and 300° C.

5. A method according to claim 1 wherein the amount of polyethylene added to the liquid is between 3 and 30 grams per 100 liters of liquid.

6. A method according to claim 1 wherein the dispersed solids are inorganic particles, carbon particles, material fibers, synthetic fibers or mixtures of two or more such solids and the liquid is a hydrocarbon, halogenated hydrocarbon, ester, ether, ketone or a mixture of two or more such liquids.

7. A method according to claim 6 wherein the amount of polyethylene added to the liquid is between 3 and 30 grams per 100 liters of liquid.

References Cited

UNITED STATES PATENTS

| | | | |
|---|---|---|---|
| 2,978,344 | 4/1961 | Parker et al. | 210—56X |
| 3,194,758 | 7/1965 | Lissant | 210—56X |
| 3,450,627 | 6/1969 | Johnson | 208—180 |

MICHAEL ROGERS, Primary Examiner

U.S. Cl. X.R.

210—49, 54, 56